Figure 1:
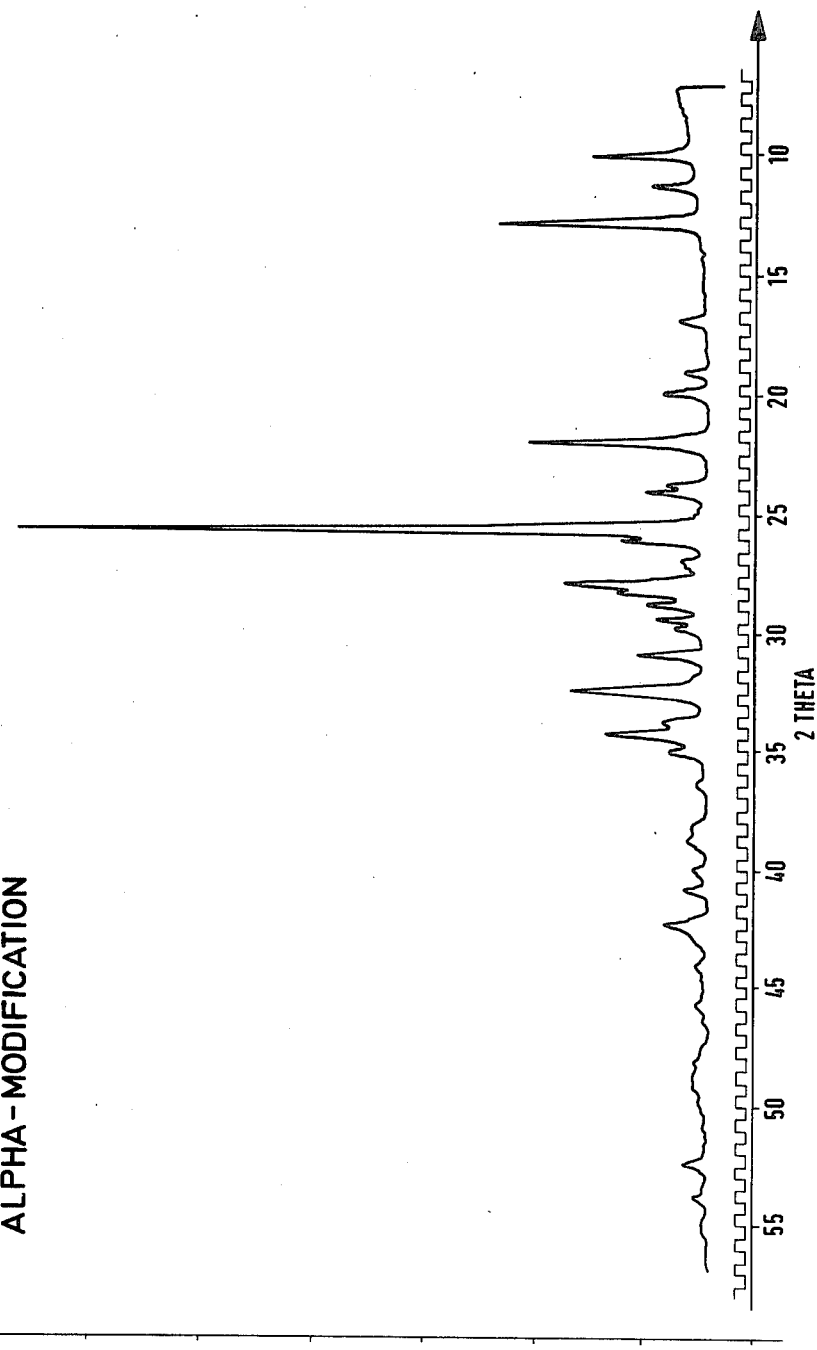
Figure 2:
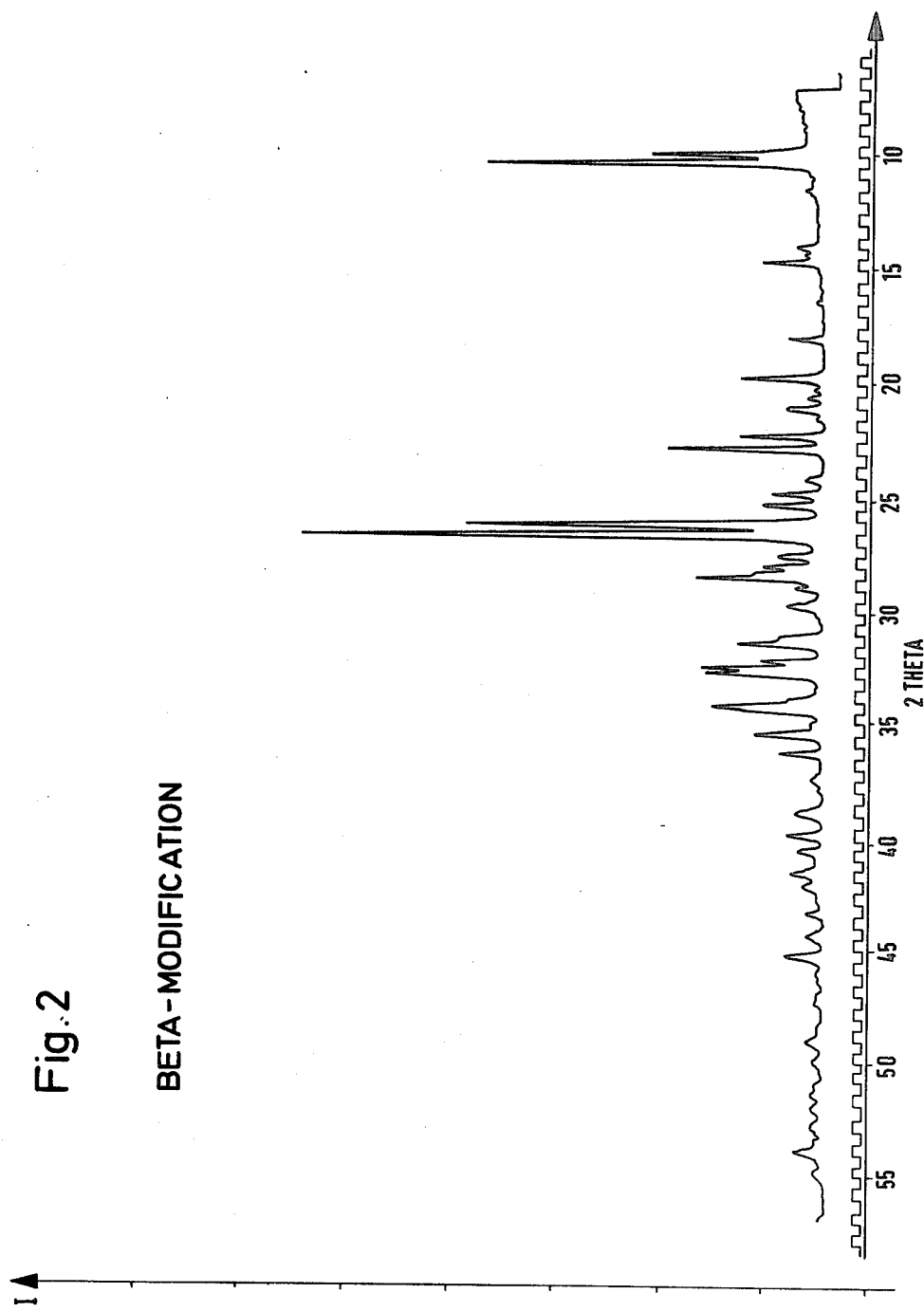

United States Patent [19]

Bäbler

[11] 4,158,661
[45] Jun. 19, 1979

[54] STABLE MODIFICATION OF AN ISOINDOLINONE PIGMENT AND PROCESSES FOR PRODUCING IT

[75] Inventor: Fridolin Bäbler, Allschwil, Switzerland

[73] Assignee: Ciba-Geigy Corporation, Ardsley, N.Y.

[21] Appl. No.: 872,403

[22] Filed: Jan. 26, 1978

[30] Foreign Application Priority Data

Feb. 3, 1977 [CH] Switzerland ............... 1316/77

[51] Int. Cl.$^2$ .................. C07D 209/50; C09B 57/00
[52] U.S. Cl. .................. 260/325 PH; 106/193 P; 106/228; 106/288 B; 260/30.2; 260/37 NP; 260/37 P
[58] Field of Search ................. 260/325 PH

[56] References Cited

FOREIGN PATENT DOCUMENTS 51-25526 3/1976 Japan ..................... 260/325 PH
51-88515 8/1976 Japan ..................... 260/325 PH

OTHER PUBLICATIONS

Ohoka et al., Chem. Abstracts, vol. 86, Abstract No. 141015w (1977).
Iwamoto et al., Chem. Abstracts, vol. 85, Abstract No. 22846n (1976).
Pugin et al., Chem. Abstracts, vol. 73, Abstract No. 46781r (1970).

*Primary Examiner*—Alton D. Rollins
*Attorney, Agent, or Firm*—Joseph F. DiPrima

[57] ABSTRACT

The bis-(4,5,6,7-tetrachloroisoindolin-1-on-3-ylidene)-phenylene-1,4-diamine pigment in a new stable modification, characterized by an X-ray diffractogram of which the four strongest lines correspond to interplanar spacings between 9.1 and 9.0, 3.56 and 3.52, 3.41 and 3.37 and also 2.98 and 2.95 Å, and having a greenish-yellow shade.

8 Claims, 3 Drawing Figures

BETA-MODIFICATION

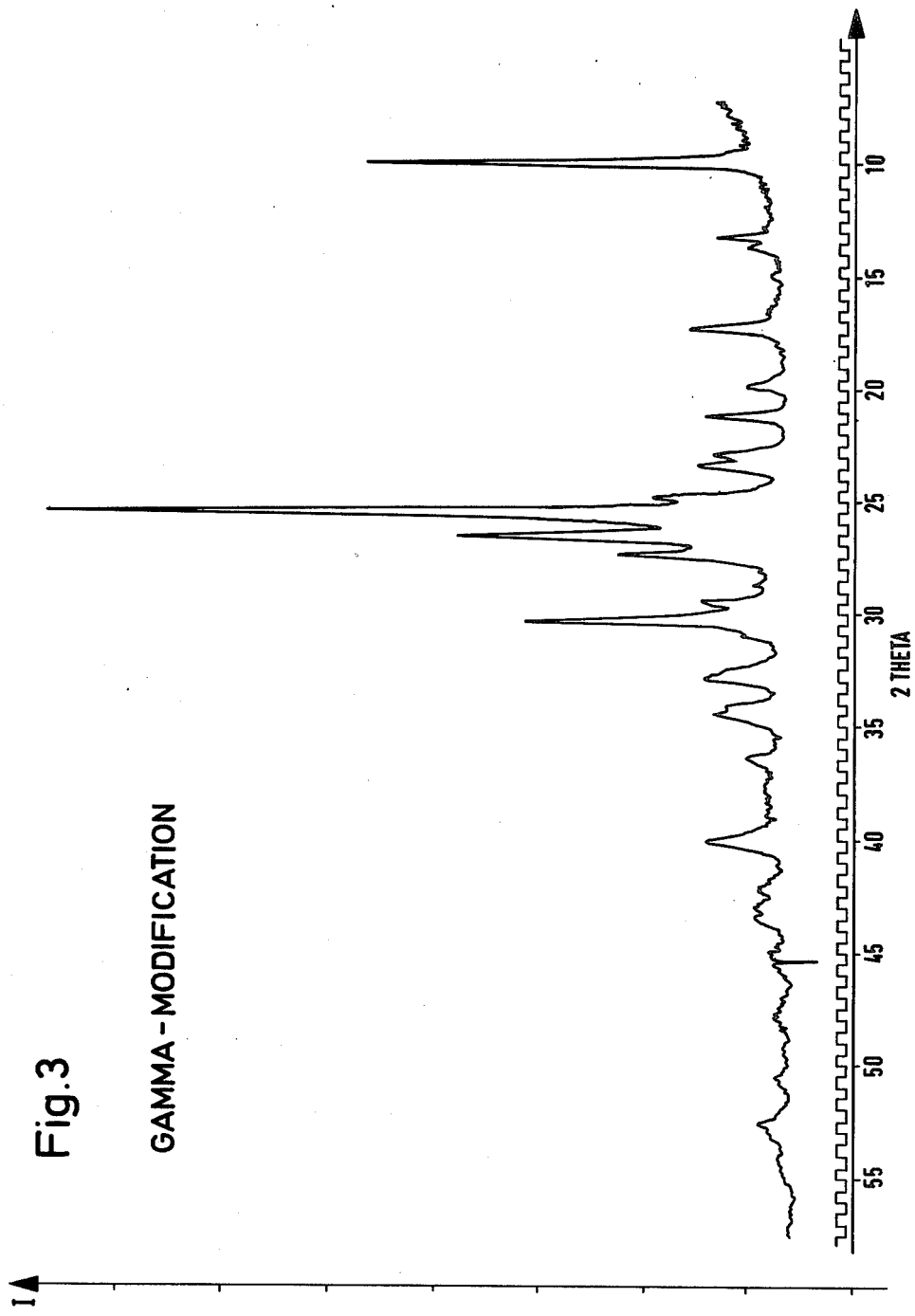

STABLE MODIFICATION OF AN ISOINDOLINONE PIGMENT AND PROCESSES FOR PRODUCING IT

From the Swiss Patent Specification No. 346,218 are known coloured products which can be produced by condensation of a polyprimary amino compound with an amount, which is equivalent to the amino groups, of identical or different isoindolin-1-ones containing in the benzene radical at least three halogen atoms, among which isoindolin-1-ones is the bis-(4,5,6,7-tetrachloroisoindolin-1-on-3-ylidene)-phenylene-1,4-diamine of the formula I

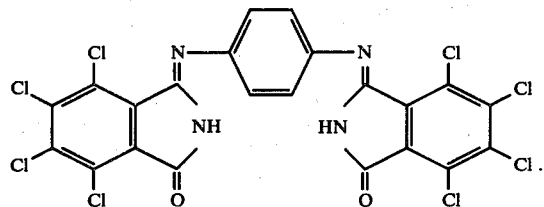

This pigment is distinguished by good fastness to light, to migration and to solvents, and has a reddish-yellow shade.

In the Japanese Offenlegungsschrift No. 13362/75 is described the production of another modification of the isoindolinone of the formula I, which is designated therein as β-modification and which is obtained by heating of the prior known isoindolinone, denoted in the publication as α-modification, at above 200° C., preferably between 250° and 300° C., in the presence or absence of an inert liquid, such as liquid paraffin, diphenyl and diphenyl ether. This new modification yields however weakly coloured dyeings, and from the point of view of application is not of interest.

There has now been found a further stable modification of the isoindolinone of the formula I, which by analogy with the above publication is designated as the γ-modification, and which is identified by an X-ray diffractogram of which the four strongest lines correspond to interplanar spacings between 9.1 and 9.0, 3.56 and 3.52, 3.41 and 3.37 and also 2.98 and 2.95 Å.

The new γ-modification can be obtained by treating an isoindolinone of the formula I of the α- or β-modification, preferably of the α-modification, with liquid ammonia or a liquid alkylamine which contains 1 to 4 carbon atoms, and which dissolves the pigment either not at all or only partially, and subsequently isolating the converted pigment. Liquid anhydrous ammonia is preferably used for the treatment. A particularly suitable starting pigment is the isoindolinone of the formula I produced by condensation of 3,3-dimethoxy-4,5,6,7-tetrachloroisoindolinone with p-phenylenediamine. Depending on the treatment medium, the conversion occurs within a shorter or longer interval of time, and frequently takes only minutes or even seconds. It is important to ensure that the pigment becomes well wetted with the ammonia or liquid alkylamine.

The liquid alkylamines used are those of the formula $R_1$—NH—$R_2$, wherein $R_1$ represents hydrogen or a methyl or ethyl group, and $R_2$ represents a methyl, ethyl, n-propyl, iso-propyl or secondary or tertiary butyl group, with the proviso that $R_1$ and $R_2$ together contain only 1 to 4 carbon atoms. Methyl-, ethyl- or n-propylamine, or mixtures thereof, are preferably used.

The treatment of bis-(4,5,6,7-tetrachloroisoindolin-1-on-3-ylidene)-phenylene-1,4-diamine can be carried out by suspending the starting product in liquid ammonia or in a liquid alkylamine, and stirring it up therein until it has been converted into the greenish-yellow new γ-modification, which is then isolated by filtration and subsequent evaporation, or by directly evaporating off the ammonia or alkylamine. Provided that the presence of small amounts of water and/or of organic solvents has no unfavourable effect on the conversion, they can be optionally tolerated. The conversion is effected however preferably in the absence of water, whereby the isoindolinone of the formula I is insoluble in ammonia and in the employed liquid alkylamines. The new γ-modification according to the invention has good fastness to light, weather, heat and solvents, and is characterised by a very high purity of shade and colouring strength. Compared with the α-modification and also with the β-modification produced by heat treatment, the new γ-modification displays a clear change in shade from reddish- to greenish-yellow, which is of interest with regard to the colouristic application, retaining at the same time the good pigment properties. It is obtained in pigment form and as a rule can be used for application without special conditioning measures being required beforehand.

The diagrams 1 to 3 represent the X-ray diffractograms for the three described modifications of the isoindolinone of the formula I. To produce the reference diagram (FIG. 3), a pigment of the new γ-modification was treated by refluxing in a mixture of methanol/chloroform 9:1 in order to improve the crystallinity. The diffractograms were recorded on a Philips Goniometer PW 1050. The three modifications can be characterised as follows:

α-modification: the four strongest lines with d-values between 9.1–9.0, 7.1–7.0, 4.15–4.05 and 3.55–3.50 Å;

β-modification: the four strongest lines in pairs between 9.15–8.65 and 3.45–3.35 Å;

γ-modification: the four strongest lines between 9.1–9.0; 3.56–3.52, 3.41–3.37 and 2.98–2.95 Å.

In order to determine the interplanar spacings (d-values) of the γ-modification, the diffraction pattern was recorded on a film (No. 962–75). For the taking of this there was used a Guinier-DeWolff No. 2 Camera with CuKα radiation (λ=1.5418 Å), and as comparative substance was used α-quartz with d-values from the ASTM File No. 5-0490. The intensities were assessed visually and were divided into five grades: very strong—strong—medium—weak—very weak. Accordingly, there are obtained for the new γ-modification for the 20 strongest lines the following values:

| Line | d[Å] | I |
|---|---|---|
| 1 | 9.05 | very strong |
| 2 | 6.81 | weak |
| 3 | 6.63 | very weak |
| 4 | 5.20 | medium |
| 5 | 4.52 | very weak |
| 6 | 4.24 | weak |
| 7 | 3.94 | weak |
| 8 | 3.85 | weak |
| 9 | 3.63 | weak |
| 10 | 3.54 | very strong |
| 11 | 3.40 | strong |
| 12 | 3.30 | medium |
| 13 | 3.06 | weak |

| Line | d[A] | I |
|---|---|---|
| 14 | 2.97 | strong |
| 15 | 2.74 | weak |
| 16 | 2.62 | weak |
| 17 | 2.48 | very weak |
| 18 | 2.26 | weak |
| 19 | 2.15 | very weak |
| 20 | 2.09 | very weak |

Depending on crystallinity, weak lines can become diffused until they disappear.

A particular advantage of the new greenish-yellow γ-modification of the isoindolinone of the formula I lies in the possibility of obtaining new colour effects with excellent fastness properties, especially in the green-blue range, by mixing with blue colouring substances.

The new γ-modification can be used for pigmenting high-molecular organic material, e.g. cellulose ethers and cellulose esters, such as ethylcellulose, nitrocellulose, cellulose acetate, cellulose butyrate, natural resins or synthetic resins, such as polymerisation resins, polyaddition resins or condensation resins, e.g. aminoplasts, particularly urea formaldehyde resins and melamine formaldehyde resins, alkyd resins, phenoplasts, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, singly or in mixtures with each other, etc.

It is in this connection of no importance whether the high-molecular compounds mentioned are in the form of plastic substances or melts, or in the form of spinning solutions, lacquers, coating compounds or printing inks. Depending on the intended use, it proves advantageous to use the new γ-modification as toners or in the form of preparations in which the pigment is embedded in a carrier.

The new γ-modification is particularly suitable for pigmenting polyvinyl chloride and polyolefins, as well as lacquers, including also metallic lacquers.

EXAMPLE 1

In a stirrer vessel cooled with carbon dioxide snow, 10 g of the reddish-yellow bis-[4,5,6,7-tetrachloroisoindolin-1-on-3-ylidene]-phenylenediamine-(1,4)-pigment in the α-modification form, which has been produced by condensation of 2 mols of 3,3-dichloro-4,5,6,7-tetrachloroisoindolinone with 1 mol of p-phenylenediamine according to Swiss Patent Specification No. 346,218, is stirred up for 20 minutes in 130 ml of liquid ammonia, in the course of which the pigment is converted into the greenish-yellow γ-modification. The ammonia is evaporated off from the vessel by heating; it is advantageous then to remove the last traces under vacuum. The ammonia-free pigment is ground, and it produces on application, for example in PVC rolled sheets, deeply coloured dyeings which, in contrast to the reddish-yellow dyeings of the starting form, are greenish-yellow.

EXAMPLE 2

A pigment of the new γ-modification having similarly good properties is obtained by using liquid methylamine instead of liquid ammonia, with the procedure otherwise being analogous to that in Example 1.

EXAMPLE 3

A pigment of the new γ-modification having similarly good properties is obtained by using liquid dimethylamine instead of liquid ammonia, with the procedure otherwise being analogous to that in Example 1.

EXAMPLE 4

(a) The same amount of the reddish-yellow isoindolinone pigment used in Example 1 is stirred up in 100 ml of n-propylamine at reflux temperature for several hours in a stirrer vessel, until the reddish-yellow α-modification has converted to the greenish-yellow γ-modification. The suspension is filtered off, and the amine still present in the residue is removed at 60°–70° C. in vacuo. The ground pigment of the new γ-modification yields, for example when incorporated into alkyd-melamine resin stoving lacquers, colouristically interesting, greenish-yellow dyeings.

(b) A pigment of the new γ-modification having similarly good properties is obtained however by stirring at room temperature instead of at reflux temperature, the procedure otherwise being carried out in a manner analogous to that described in Example 4a.

EXAMPLE 5

A pigment of the new γ-modification having similarly good properties is obtained by using diethylamine in place of n-propylamine, the procedure otherwise being carried out in a manner analogous to that described in Example 4b.

EXAMPLE 6

A pigment of the new γ-modification having similarly good properties is obtained by using isopropylamine in place of n-propylamine, the procedure otherwise being carried out in a mannar analogous to that described in Example 4b.

EXAMPLE 7

If 5 g of bis-[4,5,6,7-tetrachloroisoindolin-1-on-3-ylidene]phenylenediamine-(1,4) pigment is suspended in the β-modification produced according to the Japanese Offenlegungsschrift No. 13362/75 by heat treatment of the α-modification, in 200 ml of liquid ammonia for 3 hours, with the procedure otherwise being carried out in a manner analogous to that in Example 1, there is obtained a pigment of the new γ-modification having similarly good properties.

EXAMPLE 8

For the dyeing of PVC there is produced a mixture of
65 parts of stabilised PVC,
35 parts of dioctylphthalate,
0.07 part of β-copper phthalocyanine blue pigment, and
0.13 part of the isoindolinone pigment of the new γ-modification obtained according to Examples 1–7, and the mixture is passed backwards and forwards for 5 minutes at about 150° C. between two rollers of a calendering machine. The soft PVC sheet thus obtained displays a pure green dyeing.

EXAMPLE 9

For the dyeing of PVC, a mixture of
63.0 parts of PVC E-722 (Lonza AG),
32.0 parts of dioctylphthalate, 0.5 part of stabiliser IRGASTAB CH 300 (CIBA-GEIGY AG),
1.5 parts of stabiliser IRGASTAB BC 26 (CIBA-GEIGY AG),
3.0 parts of stabiliser Reoplast 39, (Deutsche Advance Prod. GmbH),
5.0 parts of titanium dioxide Kronos RN 56 (Kronos Titan GmbH) and
5.0 parts of titanium dioxide Kronos RN 56, and
1.0 part of the isoindolinone pigment of the new γ-modification obtained according to Examples 1–7 is rolled on mixing rolls for 8 minutes at 160° C.; it is then given 20 passes cold and again rolled at 160° C. for 2 minutes (friction 1:1.2, sheet thickness 0.4 mm). The soft PVC sheet thus obtained has, compared with a sheet dyed in an analogous manner with the starting pigment (α-modification), a considerably more greenish shade.

EXAMPLE 10

A mixture of
1.0 part of the isoindolinone pigment of the new γ-modification, obtained according to Examples 1–7,
1.0 part of antioxidant IRGANOX 1010 (CIBA-GEIGY AG), and
1000.0 parts of polyethylene HD powder Vestolen AX 763 (Hüls)

is preliminary mixed for 15 minutes in a 3-liter glass bottle on a Rhönrad mixer. The mixture is afterwards extruded in 2 passes at 160° C. on a single-screw extruder; the granulate thus obtained is then injection moulded on an injection moulding machine (Allround Aarburg 200) at 200° C. to form sheets, and these are subsequently pressed for 5 minutes at 160° C. The moulded sheets display a greenish-yellow dyeing which has excellent fastness properties.

EXAMPLE 11

A mixture of
130 parts of steatite balls φ 8 mm,
47.5 parts of alkyd-melamine stoving lacquer consisting of
  60 parts of Beckosol 27-320, 60% in xylene, (Reichhold Chemie AG),
  36 parts of Super-Beckamin 13-501, 50% (Reichhold Chemie AG),
  2 parts of xylene and
  2 parts of methyl glycol, and
2.5 parts of the isoindolinone pigment of the new γ-modification obtained according to Examples 1–7 is dispersed in a 200 ml glass bottle with twist-off cap for 120 hours on a roller device. After removal of the steatite balls, there are mixed together
2.4 parts of the full-tone mixture thus dispersed,
6.0 parts of titanium dioxide Kronus RN 59 (Kronus Titan GmbH), and
24.0 parts of the above alkyd-melamine stoving lacquer;
the mixture obtained is sprayed onto aluminium sheets and stoved at 130° C. for 30 minutes.
Greenish-yellow dyeings having excellent fastness properties are obtained.

EXAMPLE 12

A mixture of
130 parts of steatite balls φ=8 mm,
47.5 parts of a thermosetting acrylic lacquer consisting of
  41.3 parts of Viacryl VC 373, 60% (VIANOVA Kunstharz AG),
  16.3 parts of Maprenal TTX, 55% (HOECHST AG),
  32.8 parts of xylene,
  4.6 parts of ethyl glycol acetate,
  2.0 parts of butyl acetate and
  1.0 part of silicone oil (Silikonöl A), 1% in xylene (BAYER AG), and
2.5 parts of the isoindolinone pigment of the new γ-modification obtained according to Examples 1–7 is dispersed in a 200 mg glass bottle with twist-off cap for 72 hours on a roller device. After removal of the steatite balls, there are well mixed together
8.0 parts of the full-tone mixture thus dispersed,
0.6 part of Alcoa paste, 60–65% Al content (Aluminium Comp. of America),
1.0 part of methyl ethyl ketone and
18.4 parts of the above thermosetting acrylic lacquer;
this mixture is then sprayed onto aluminium sheets and subsequently stoved for 30 minutes at 130° C.
Greenish-yellow metallised dyeings having excellent fastness properties are obtained.

EXAMPLE 13

If 2.0 parts of a 50% pigment preparation consisting of 1.0 part of the isoindolinone pigment obtained according to Examples 1–7 and 1.0 part of Mg-behenate are used instead of 1.0 part of the pure toner pigment, the procedure followed being otherwise as described in Example 10, there are obtained mouldings which are dyed greenish-yellow and which have similarly good properties.

I claim:
1. Isoindolinone pigment of the formula I

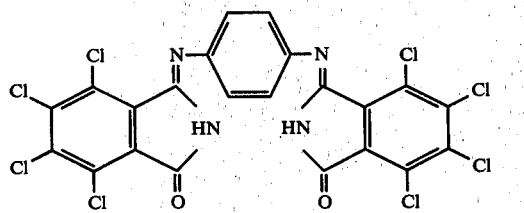

in a new stable modification, characterised by an X-ray diffractogram of which the four strongest lines correspond to interplanar spacings between 9.1 and 9.0, 3.56 and 3.52, 3.41 and 3.37 and also 2.98 and 2.95 Å.

2. Isoindolinone pigment of the formula I according to claim 1, characterised by an X-ray diffractogram which shows at an interplanar spacing of 9.05 Å a line of very strong intensity, at 6.81 Å a line of weak intensity, at 6.63 Å a line of very weak intensity, at 5.20 Å a line of medium intensity, at 4.52 Å a line of very weak intensity, at 4.24, 3.94, 3.85 and 3.63 Å lines of weak intensity, at 3.54 Å a line of very strong intensity, at 3.40 Å a line of strong intensity, at 3.30 Å a line of medium intensity, at 3.06 Å a line of weak intensity, at 2.97 Å a line of strong intensity, at 2.74 and 2.62 Å lines of weak intensity, at 2.48 Å a line of very weak intensity, at 2.26 Å a line of weak intensity, and at 2.15 and 2.09 Å lines of very weak intensity.

3. A process for producing a new stable modification of the isoindolinone pigment according to claim 1, which comprises treating under anhydrous conditions the isindolinone of the formula I with liquid ammonia or a liquid alkylamine which contains 1–4 carbon atoms, and in which the pigment is insoluble or essentially insoluble; and isolating the converted pigment under anhydrous conditions.

4. A process according to claim 3, wherein isoindolinone of the formula I is treated with liquid anhydrous ammonia.

5. A process according to claim 4, wherein isoindolinone of the formula I produced by condensation of 3,3-dimethoxy-4,5,6,7-tetrachloroisoindolinone with p-phenylenediamine is treated with liquid anhydrous ammonia.

6. A process according to claim 3, wherein the treatment is carried out with a liquid alkylamine of the formula $R_1NHR_2$ in which $R_1$ represents hydrogen or a methyl or ethyl group, and $R_2$ represents a methyl, ethyl, n-propyl, iso-propyl or secondary or tertiary butyl group.

7. A process according to claim 6, wherein isoindolinone of the formula I is treated with methyl, ethyl or n-propylamine.

8. A process according to claim 3, which process comprises suspending isoindolinone of the formula I in liquid ammonia or in liquid alkylamine; stirring the isoindolinone up therein until its conversion into a new stable modification has occurred; and subsequently evaporating off the ammonia or alkylamine.

* * * * *